United States Patent
Acker et al.

(10) Patent No.: US 11,622,241 B2
(45) Date of Patent: *Apr. 4, 2023

(54) PROVIDING FUNCTIONAL MODELS TO HUBS TO ENHANCE OPERATION OF THE HUBS

(71) Applicant: Skylo Technologies, Inc., Palo Alto, CA (US)

(72) Inventors: Christopher Acker, Los Altos, CA (US); Meghna Agrawal, Cupertino, CA (US); Andrew Nuttall, Mountain View, CA (US)

(73) Assignee: Skylo Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,273

(22) Filed: Jul. 25, 2022

(65) Prior Publication Data

US 2022/0360952 A1 Nov. 10, 2022

Related U.S. Application Data

(63) Continuation of application No. 17/120,181, filed on Dec. 13, 2020, now Pat. No. 11,451,935.

(51) Int. Cl.
*H04W 4/00* (2018.01)
*H04W 4/06* (2009.01)
*H04L 12/18* (2006.01)
*H04L 41/0806* (2022.01)

(52) U.S. Cl.
CPC ........... *H04W 4/06* (2013.01); *H04L 12/1881* (2013.01); *H04L 41/0806* (2013.01)

(58) Field of Classification Search
None
See application file for complete search history.

(56) References Cited

U.S. PATENT DOCUMENTS

| | | | |
|---|---|---|---|
| 8,175,616 B2 | 5/2012 | Fomukong et al. |
| 8,195,188 B2 | 6/2012 | Fomukong |
| 2016/0331973 A1 | 11/2016 | Wheeler et al. |
| 2017/0082447 A1 | 3/2017 | Ricci |

*Primary Examiner* — Abdelillah Elmejjarmi
(74) *Attorney, Agent, or Firm* — Brian R. Short

(57) ABSTRACT

Apparatuses, methods, and systems for providing function models to hubs, are disclosed. One method includes sensing, by a hub, local data, collecting the local data from the hub, creating function models based on the collected local data and non-local data collected from non-local data sources, dynamically creating non-local inputs based upon the local data from the hub and the non-local data collected from non-local data sources, transmitting the created function models to the plurality of hubs at a first timing, and dynamically transmitting the non-local inputs to each of the plurality of hubs at a second timing, and applying, by the hub, current locally sensed data and the dynamically transmitted non-local inputs to the created function models.

18 Claims, 12 Drawing Sheets

Sensing, by a plurality of hubs, local data, wherein the local data is sensed by one or more sensors associated with the plurality of hubs
810

Collecting, by a system platform, the local data from the plurality of hubs
820

Creating, by the system platform, function models based on the collected local data and outside data collected from outside data sources
830

Dynamically creating, by the system platform, non-local inputs for each of the plurality of hubs based upon the local data from the plurality of hubs and the outside data collected from outside data sources, a location of the hub, a time, and an application the hub serves
840

Transmitting the created function models to the plurality of hubs at a first timing, and dynamically transmitting the non-local inputs to each of the plurality of hubs at a second timing based on the location of the hub, the time, and the application the hub serves
850

Applying, by one or more of the plurality of hubs, current locally sensed data and the dynamically transmitted non-local inputs to the created function models
860

Figure 8

Multicast Scheduling Control Packet
Dictionary Maps: [ Groups of Hubs – Multicast Channel Configurations]
1010 
[ Hub Groups: 1, 5, 6 | Time Offset: 10 Frames | Periodicity: 5 Hyperframes | Scrambling Code: RNTI1]
1020 
[ Hub Groups: 10, 8, 6 | Time Offset: 5 Frames | Periodicity: 1 Hyper frame | Scrambling Code: RNTI1]
Figure 10

Generating, by a system platform, a multicast scheduling control packet based upon a distribution (firmware, customer, application, geography) of a plurality of network registered hubs
1210

Communicating, by the system platform, to a wireless communication base station the multicast scheduling control packet
1220

Generating, by the wireless communication base station, a plurality of multicast channel configurations based upon the multicast scheduling control packet
1230

Communicating, by the system platform the multicast scheduling control packet to a wireless communication hub, wherein the wireless communication hub is one of the plurality of network registered hubs
1240

Selecting, by the wireless communication hub, specific multicast channels from the plurality of multicast channel configurations, to receive specific multicast data based upon a condition (a configuration or an environment) the hub and the multicast scheduling control packet
1250

Receiving, by the wireless communication hub, multicast data through the selected specific multicast channel configurations
1260

Figure 12

PROVIDING FUNCTIONAL MODELS TO HUBS TO ENHANCE OPERATION OF THE HUBS

RELATED PATENT APPLICATIONS

This patent application is a continuation of U.S. patent application Ser. No. 17/120,181, filed Dec. 13, 2020, which is herein incorporated by reference.

FIELD OF THE DESCRIBED EMBODIMENTS

The described embodiments relate generally to wireless IoT (Internet of Things) devices. More particularly, the described embodiments relate to systems, methods and apparatuses for providing function models to hubs to enhance operation of the hubs.

BACKGROUND

Machine learning is an asymmetric process when comparing machine learning versus execution based on the machine learning. For at least some embodiments, the bulk of machine learning applications involve solving a high dimensional optimization problem with large datasets to learn classification or regression coefficients. The requirements to solve for the learned coefficients are orders of magnitude larger than the requirements to use the solved coefficients to perform a classification or regression model execution. In the context of IoT systems, the result is that IoT devices and systems are not well suited for machine learning.

The Internet of Things (IoT) includes large numbers of devices being connected to the internet. Due to the large number of devices, maintaining or updating the devices can be an onerous task.

It is desirable to have methods, apparatuses, and systems for providing function models to hubs to enhance operation of the hubs of an IoT wireless network.

SUMMARY

An embodiment includes a method of providing function models to hubs to enhance operation of the hubs. The method includes sensing, by a hub, local data, wherein the local data is sensed by one or more sensors associated with the hub, collecting, by a system platform, the local data from a hub, creating, by the system platform, function models based on the collected local data and non-local data collected from non-local data sources, dynamically creating, by the system platform, non-local inputs based upon the local data from the hub and the non-local data collected from non-local data sources, transmitting the created function models to the hub at a first timing, and dynamically transmitting the non-local inputs to each of the hub at a second timing, wherein the first timing occurs when changes have occurred to features of the created function models, and wherein the second timing includes routine or adaptive transmission of the non-local inputs to the hub, and applying, by the hub, current locally sensed data and the dynamically transmitted non-local inputs to the created function models.

Another embodiment includes a system platform. The system platform is configured to collect local data from a hub, create function models based on the collected local data and non-local data collected from non-local data sources, dynamically create non-local inputs based upon the local data from the hub and the non-local data collected from non-local data sources, transmit the created function models to the hub at a first timing, and dynamically transmit the non-local inputs to each of the hub at a second timing, wherein the first timing occurs when changes have occurred to features of the created function models, and wherein the second timing includes routine or adaptive transmission of the non-local inputs to the hub, wherein the hub applies current locally sensed data and the dynamically transmitted non-local inputs to the created function models.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 8 is a flow chart that includes steps of a method of providing function models to hubs to enhance operation of the hubs, according to an embodiment.

FIG. 10 show examples of multicast scheduling control packets generated by a system platform, according to an embodiment.

FIG. 12 is a flow chart that includes steps of a method of configuring multicast IoT (Internet of Things) communication, according to an embodiment.

DETAILED DESCRIPTION

The embodiments described include methods, apparatuses, and systems for providing function models to hubs to enhance operation of the hubs. For an embodiment, the hub are wireless devices, and the functional models are provided to the hubs by a system platform through a wireless base station. As previously described, machine learning is an asymmetric process when comparing the machine learning versus execution based on the learning. For at least some embodiments, the bulk of machine learning applications involve solving a high dimensional optimization problem with large datasets to learn classification or regression coefficients. The requirements to solve for the learned coefficients are orders of magnitude larger than the requirements to use the solved coefficients to perform a classification or regression model execution. In the context of IoT systems the result is that IoT devices and systems are not well suited for machine learning, but IoT devices and systems can be well suited to execute against learned models.

At least some of the described embodiments include a network of IoT devices (hubs) collecting well controlled/uniform sensor data across time/space and reporting the collected sensor data to a centralized server (system platform). For an embodiment, the centralized server (system platform) then pools the collected IoT sensor data across similar and dissimilar IoT sensors to create a pooled IoT data bin. For an embodiment, a local data process retrieves the data from the pooled IoT data as well as from other external data sources (for example, weather data). For an embodiment, machine learning (ML) algorithms are run to solve for simple models which can be executed on the edge by the IoT devices (hubs) to solve for solution/application needs (for example, a feed forward neural network to determine if a truck door was left open based upon vibration and photometer sensors).

For at least some embodiments, ML models have feature inputs of sensor data which is collected locally at a hub and global location/temporal/application germane features. For at least some embodiments, the models and the additional global features are transmitted to the edge IoT devices (hubs) on a regular basis to allow local edge computing, classification, and/or regression capabilities.

Figure 1:
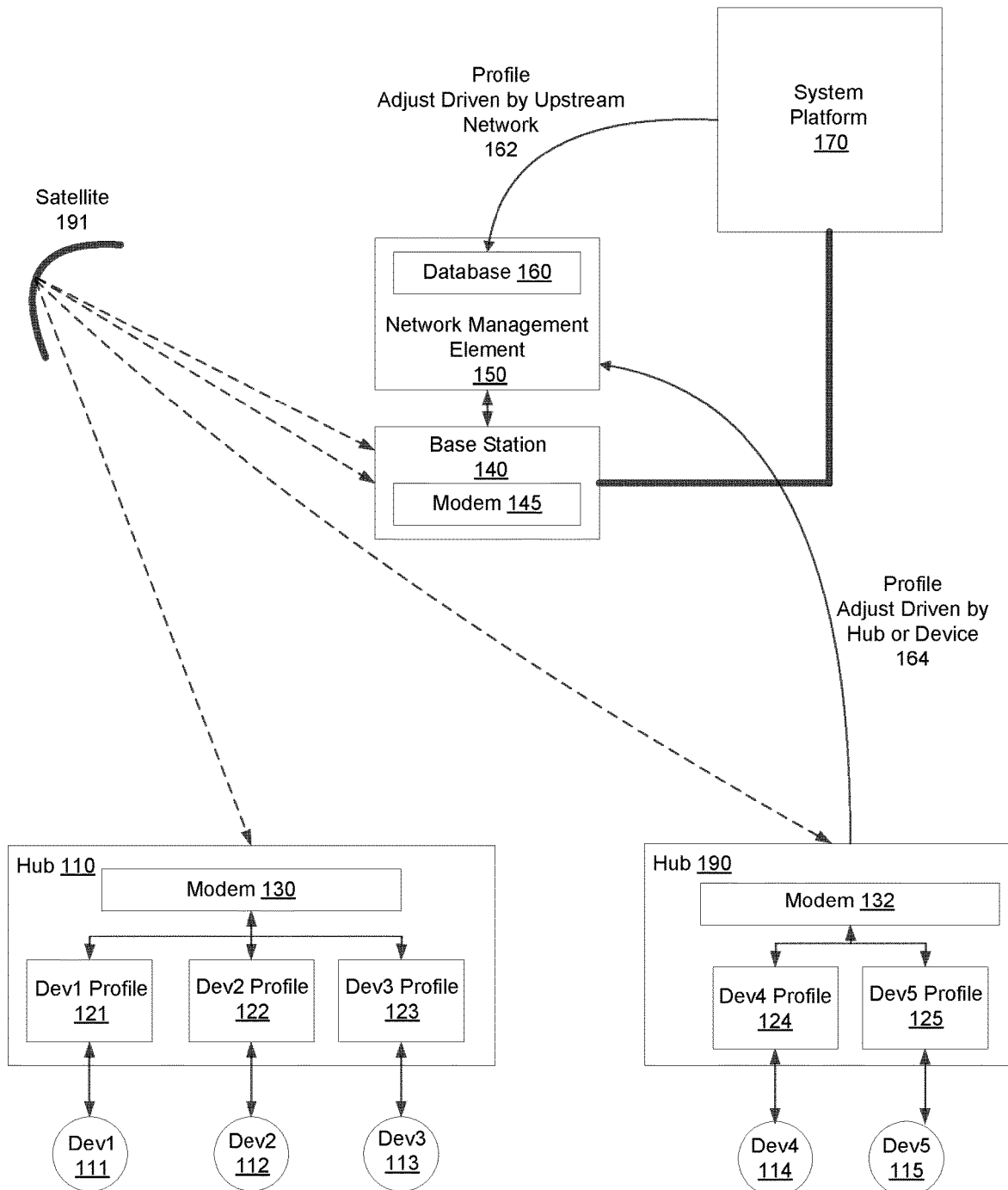
FIG. 1 shows wireless devices operating to communicate with a base station through a satellite, according to an embodiment.

FIG. 1 shows hubs 110, 190 operating to communicate with a base station 140 through a satellite 191, according to an embodiment. For at least some embodiments, the hubs 110, 190 are mobile devices. For an embodiment, the hubs 110, 190 are able to communicate with a system platform 170 through the base station 140. Modems 130, 132 of the hubs 110, 190, and modem 145 of the base station 140 enable the hubs 110, 190 to wirelessly communicate with the base station 140.

At least some embodiments include the system platform 170 updating operation of the hubs 110, 190. As there may be a large number of hubs for a single system platform, an embodiment includes the system platform facilitating multicasting of update information to many hubs, thereby efficiently updating the hubs. For example, the system platform 170 can simultaneously update firmware operating on many different hubs by controlling multicasting of firmware updates to the different hubs. Further, as will be described, at least some embodiments include multicast transmission of function models and/or non-local inputs to the function models.

In computer networking, multicast is group communication where data transmission is addressed to a group of destination computers simultaneously. Multicast can be one-to-many or many-to-many distribution, Here, the destination computing devices are the hubs 110, 190, which are updated by the system platform 170. For an embodiment, the system platform 170 operates to create a multicast channel to enable firmware over the air updating of the hubs 110, 190. Further, the multicast channel supports updating other types of information of the hubs 110, 190. While only two hubs 110, 190 are shown in FIG. 1, the described embodiments for updating the hubs is applicable to very large numbers of hubs.

For at least some embodiments, the system platform 170 informs or alerts the hubs when a multicast is going to occur. Further, for at least some embodiments, each hub 110, 190 provides an indication to its corresponding hub modem 130, 132 to start receiving multicast packets transmissions from the base station 140.

For at least some embodiments, an application operating on each of the hubs 110, 190 operates to manage the reception of multicast packets. If, for example, the modem of the hub misses the reception of one or more multicast packets (for example, due to higher priority operations) the application operating on the hub manages the requesting of the missed one or more packets from the system platform 170. For example, the application operating on the hub may manage ACK ((acknowledgment) a confirmation of receipt) and back (negative acknowledgement) responses to reception of multicast packets.

For an embodiment, a network management element 150 may access a database 160, aid in generating the schedule communication, and provide the scheduled communication to the base station 140. For an embodiment, the scheduled communication includes allocating frequency and time slots for both uplink and downlink wireless communication.

For an embodiment, the network management element 150 additionally generates a data profile 121, 122, 123, 124, 125 for each of the hubs 110, 190. For example, the server 150 generates the data profile that the base station 140 provides to the hubs 110, 190. For an embodiment, the data profile includes a periodicity, an offset, and a carrier frequency based on the scheduled communication. For an embodiment, the hubs 110, 190 utilizes the periodicity, the offset, and the carrier frequency of its data profile for determining when and at what carrier frequency to transmit uplink wireless communication to the base station 140.

For at least some embodiments, the system platform 170 additionally or alternatively provides a functional model and/or non-local inputs to the functional model to the hubs through the data profiles.

For an embodiment, the base station 140 then receives uplink wireless communication from each of the plurality of hubs 110, 190 according to the data profile of each of the hubs 110, 190 and according to the scheduled communication. For an embodiment, the hubs 110, 190 use the data profiles 121, 122, 123, 124, 125 for determining when to transmit, and the base station 140 uses the scheduled communication to determine when to receive the uplink wireless communication. For at least some embodiments, each of the data profiles 121, 122, 123, 124, 125 corresponds with a data device 111, 112, 113, 114, 115 connected to the hubs 110, 190. The data devices 111, 112, 113, 114, 115 collected data that can be reported by the hubs 110, 190.

For an embodiment, after the time period of the scheduled communication, the base station 140 simultaneously broadcasts acknowledgements of reception of the uplink wireless communication from each of the plurality of hubs 110, 190. That is, the simultaneously broadcast acknowledgement includes acknowledgments directed to each of the individual hubs 110, 190 and indicates whether the scheduled uplink communication received from each of the individual hubs 110, 190 was successfully received. Each of the individual hubs 110, 190 can determine whether its uplink wireless communication was successfully received based on reception of the broadcast acknowledgement. That is, each of the hubs 110, 190 determine whether the uplink wireless communication was successful based on the simultaneously broadcast acknowledgements, wherein reception of the simultaneously broadcast acknowledgements by each hub is facilitated by the data profile of the hub. For an embodiment, the hub utilized the periodicity, the offset, and the carrier frequency within the data profile to determine or identify acknowledgements of uplink communication of the hub to the base station.

For an embodiment, the broadcast acknowledgement originates at the server 150. For an embodiment, the broadcast acknowledgement originates at the base station 140. By including the acknowledgments of many hubs within a single broadcast acknowledgement rather than generating a separate transmitted acknowledgment for each individual hub saves wireless communication air-time. This becomes more and more true as the number of hubs increases.

For at least some embodiments, the data profiles can be adjusted 164 by the hub or device, or the data profiles can be adjusted 162 by the system platform.

For at least some embodiments, the profiles are used for the conveying the multicast information to the hubs and/or devices.

Figure 2:
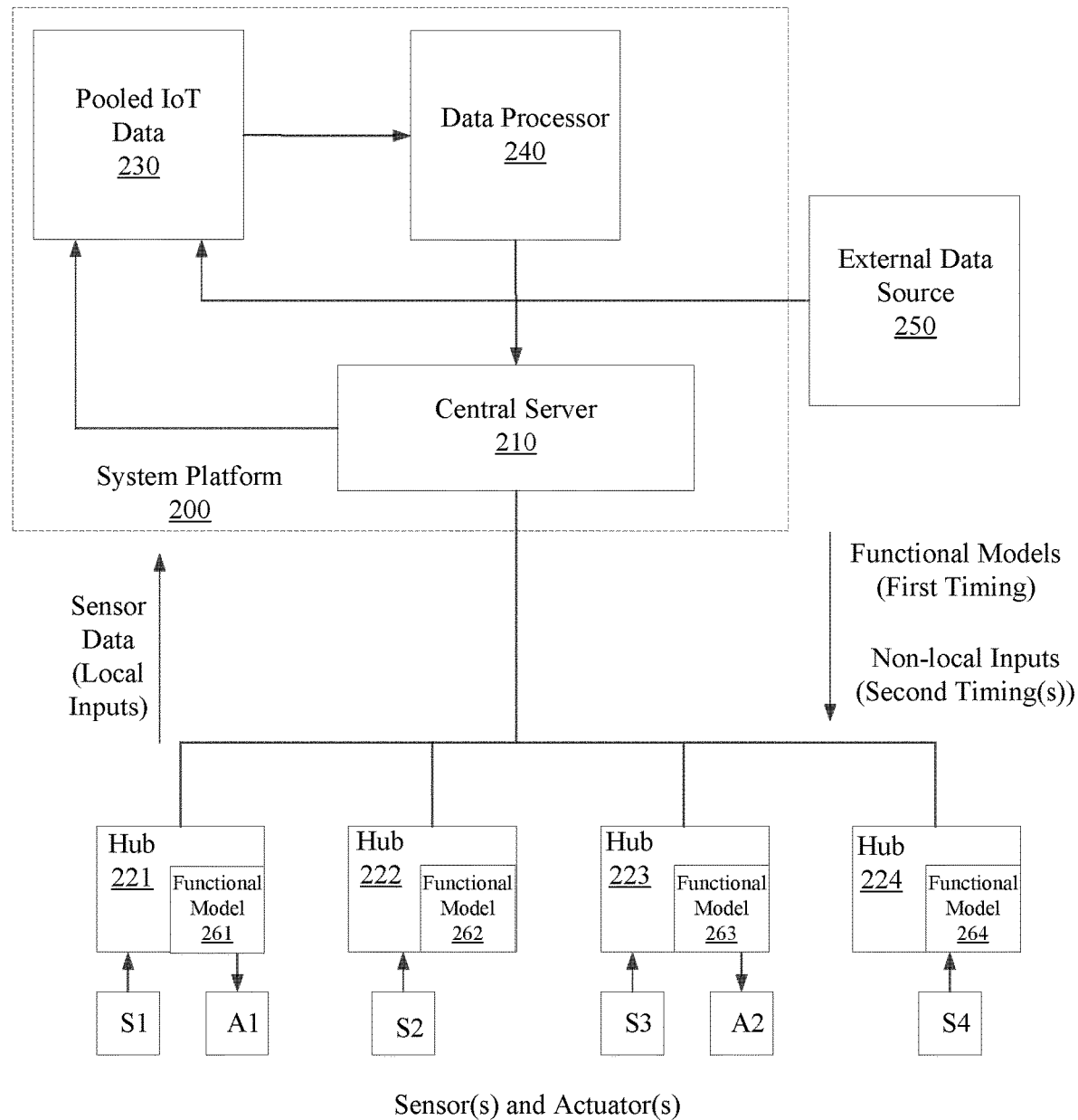
FIG. 2 shows a plurality of hubs reporting sensed local information to a system platform, and the system platform providing function models and non-local inputs to each of the plurality of hubs, according to an embodiment.

FIG. 2 shows a plurality of hubs 221, 222, 223, 224 reporting sensed local information to a system platform 200, and the system platform 200 providing function models and non-local inputs to each of the plurality of hubs 221, 222, 223, 224, according to an embodiment. For at least some embodiments the hubs 221, 222, 223, 224 include sensors (S1-S6) that sense local sensor inputs that are provided to the system platform as the reported local information.

For at least some embodiments, the system platform 200 collects the local data from the plurality of hubs 221, 222, 223, 224. As shown, for an embodiment, the system platform 200 includes a central server 210, a pooled IoT (hub) data 230 (summation of all connected hub sensed data), and a data processor 240. Further, the system platform 200 receives outside data from one or more external data sources 250 which can be stored in the pooled IoT (hub) data 230. The system platform (central server 210 and data processor 240) operates to create functional models based on the collected local data (pooled IoT (hub) data 230) and outside data collected from outside data sources (external data sources 250).

For an embodiment, the system platform 200 (central server 210 and data processor 240) further operates to dynamically create non-local inputs for each of the plurality of hubs based upon the local data from the plurality of hubs 221, 222, 223, 224 and the outside data collected from outside data sources, a location of the hub, a time, and an application the hub serves. For an embodiment, the system platform 200 (central server 210 and data processor 240) further operates to dynamically creating non-local inputs for each of the plurality of hubs based upon the local data from the plurality of hubs 221, 222, 223, 224 and the outside data collected from outside data sources, and further based on a location of the hub, a time, or an application the hub serves.

For an embodiment, the system platform 200 (center server 210 and data processor 240) further operates to transmit the created function models to the plurality of hubs 221, 222, 223, 224 at a first timing. The hubs 221, 222, 223, 224 then maintain the most recently transmitted functional models 261, 262, 263, 264.

For an embodiment, the system platform 200 (center server 210 and data processor 240) further operates to dynamically transmit the non-local inputs to each of the plurality of hubs 221, 222, 223, 224 at one or more second timings based on the location of the hub, the time, and/or the application the hub serves. For an embodiment, the location of the hub is a physical location of the hub. For an embodiment, the time is a current time at the hub. As previously mentioned, for an embodiment, at least one of the created functional models and/or the non-local inputs are provided to the hubs through multicast transmission. Further, for an embodiment, at least one of the created functional models and/or the non-local inputs are provided to the hubs through the hub profiles.

At least some embodiments include scheduling transmission of the second timing(s) of the non-local inputs as scheduled multicast transmissions that are coordinated with sleep schedules of the hubs. That is, for some embodiments, the hubs only receive sensed data intermittently and the functional models provided to the hubs only need to generate an action or inaction determination intermittently. Accordingly, power consumption of the hubs can be moderated (reduced) by de-activating the hubs into power savings modes for periods of time in which the hubs are inactive. The deactivation can include deactivating electronic circuitry (such as, modems) that is not needed to save power consumption of the hubs. For an embodiment, power saving is achieved by providing the hubs with schedules that include periods of deactivation (sleep mode) of the hubs, and periods in which the hubs are to received scheduled multicast transmission at the second timings that include the non-local inputs to the functional models.

For an embodiment, when a hub receives non-local inputs through a multicast transmission, the hub provides a response (for example, as an output of the functional model) to the non-local inputs received through the multicast transmission using a directed random-access channel (RACH). For an embodiment, when a hub receives non-local inputs through a multicast transmission, the hub provides a response (for example, as an output of the functional model) to the non-local inputs received through the multicast transmission at a predetermined time offset, and frequency/preamble as described by a a-priori coordinated hub profile. Accordingly, the described embodiments provide a low energy/spectrally efficient machine learning satellite IoT network.

For an embodiment, one or more of the plurality of hubs 221, 222, 223, 224 apply current locally sensed data and the dynamically transmitted non-local inputs to the created function models. That is, after the plurality of hubs 221, 222, 223, 224 receive the created functional model(s) at the first timing and the non-local inputs at the second timing(s) (one or more timings), one of more of the hubs generates an actionable (or determined nonactionable) output based on at least one of the created functional models and inputs to the created functional models that includes the currently locally sensed data and the dynamically transmitted non-local inputs. It is to be understood that the non-local inputs are provided as a function of time, and therefore, the currently available (most recently received) non-local inputs of each of the hubs are input to each of the hubs. The action or nonaction of the output of the functional models 261, 262, 263, 264 of the hubs 221, 222, 223, 224 can be applied to actuators A1, A2 of the hubs 221, 222, 223, 224.

For an embodiment, the system platform 200 which includes the centralized server 210 collects the local data from hubs 221, 222, 223, 224 and outside data of outside data sources. The system platform further operates to perform machine learning (ML) model creation, and non-local inputs creation. Further, the system platform 200 operates to initiate transmission of both the function models 261, 262, 263, 264 and non-local inputs to the hubs 221, 222, 223, 224 according to the previously describe first timing and second timing(s).

For at least some embodiments, the each of the functional models 261, 262, 263, 264 includes a generic or bespoke model which maps an input(s) (local inputs and non-local inputs) to an output for execution on a hub. For example, a primitive model may include f(x)=Ax, where f(x) is the model, A, is a learned variable based upon data, wherein the structure Ax is based upon the features of the problem attempting to be addressed, and where x is an input (either local or non-local).

For at least some embodiments, the local input includes data collected from sensors that are in local (spatial) proximity to the hub. The local data is communicated by the hub to the system platform over local networks (for example, the previously described satellite network), and is not transmitting across a backhaul infrastructure.

For at least some embodiments, the non-local inputs include data collected, or synthesized, from aggregate local data and outside data sources by the system platform. The system platform then provides the non-local inputs to each of the hubs.

Use Case

An exemplary application includes, for example, 10,000 hubs distributed over the state of California that are used by farmers to monitor soil and/or crop health. The plurality of hubs across the farms collect non-uniform local sensor data, such as, nitrogen levels, moisture levels, etc. For an embodiment, the local sensor data is uploaded (for example, communicated to a base station through a satellite link) to the system platform, where it is combined with external data (such as, weather data, California climate data, and seasonal pest data) to produce fertilizer and/or irrigation functional models for the farmers.

For an embodiment, the functional models are transmitted to the hubs when the hubs are first provisioned, and can be updated (updated or new functional models) upon, for example, the change of growing seasons.

For an embodiment, during execution the hubs take local (sensed) measurements which are also combined with non-local inputs. For an embodiment, the non-local inputs vary by hub (based upon the deficiency between required inputs and locally available inputs) and are transmitted, for example, every hour during sunlight and every 4 hours during sundown. Some non-local variables may be sensed measurements like local weather, and some may be synthetic, such as, extrapolated soil nitrogen levels based upon surrounding farmers sensed measurements.

For an embodiment, the hubs use both the local and non-local inputs to execute the function model and to take action by, for example, turning on an irrigation pump, or by alerting a fertilizer company for another shipment.

Figure 3:
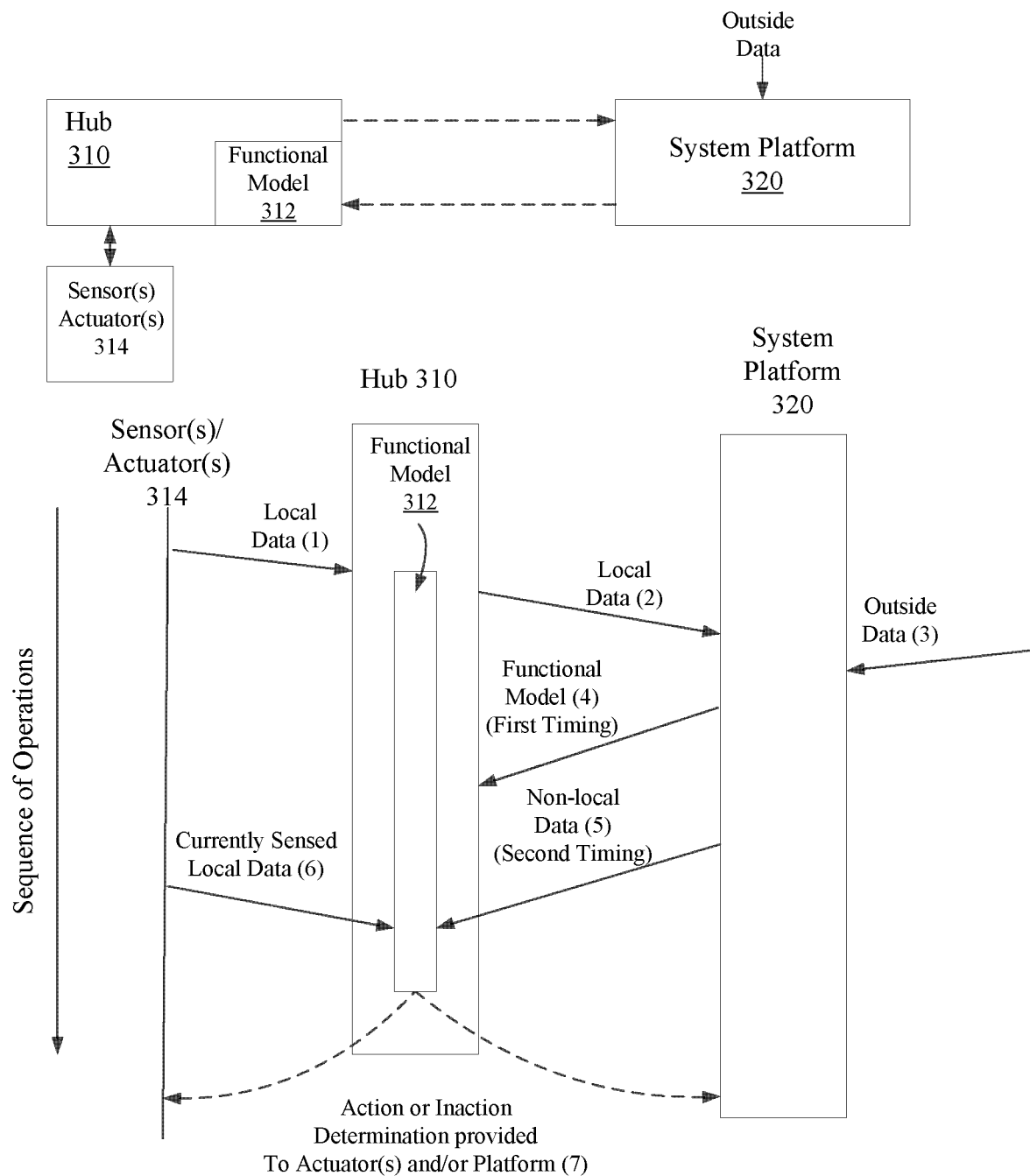
FIG. 3 shows a sequence of operations for generating a functional model, providing the functional model to a hub, and generating an action or inaction based on the functional model, non-local inputs, and local inputs, according to an embodiment.

FIG. 3 shows a sequence of operations for generating a functional model 312, providing the functional model 312 to a hub 310, and generating an action (or inaction) based on the functional model 312, non-local inputs, and local inputs, according to an embodiment. For an embodiment, sensor(s)/actuator(s) 314 associated with the hub 310 sense local data. A step (1) includes the sensor(s) 310 providing the local data to the to the hub 310. A step (2) includes the hub 310 providing the local data to a system platform 320. A step (3) includes the system platform 320 receiving outside data. As previously stated, the system platform 320 generates the functional model 312 based at least on the local data and the outside data. A step (4) includes the system platform 320 providing the functional model 312 to the hub 310 at the first timing. A step (5) includes the system platform 320 providing the non-local inputs to the hub 310 at the second timing(s). A step (6) includes the functional model 312 receiving currently sensed local data from the sensor(s) 314. As previously described, for an embodiment, the non-local data (non-local inputs) for each of the plurality of hubs is generated based upon the local data from the plurality of hubs and the outside data collected from outside data sources, and further based on at least one of a location of the hub, a time, and/or an application the hub serves. A step (7) includes the functional model 312 generating an output when receiving the currently sensed local data and the non-local data, wherein the output is used to determine whether to perform and action, or to not perform any action. The output (action or non-action) is provided to an actuator 314 or back to the system platform 320.

Figure 4:
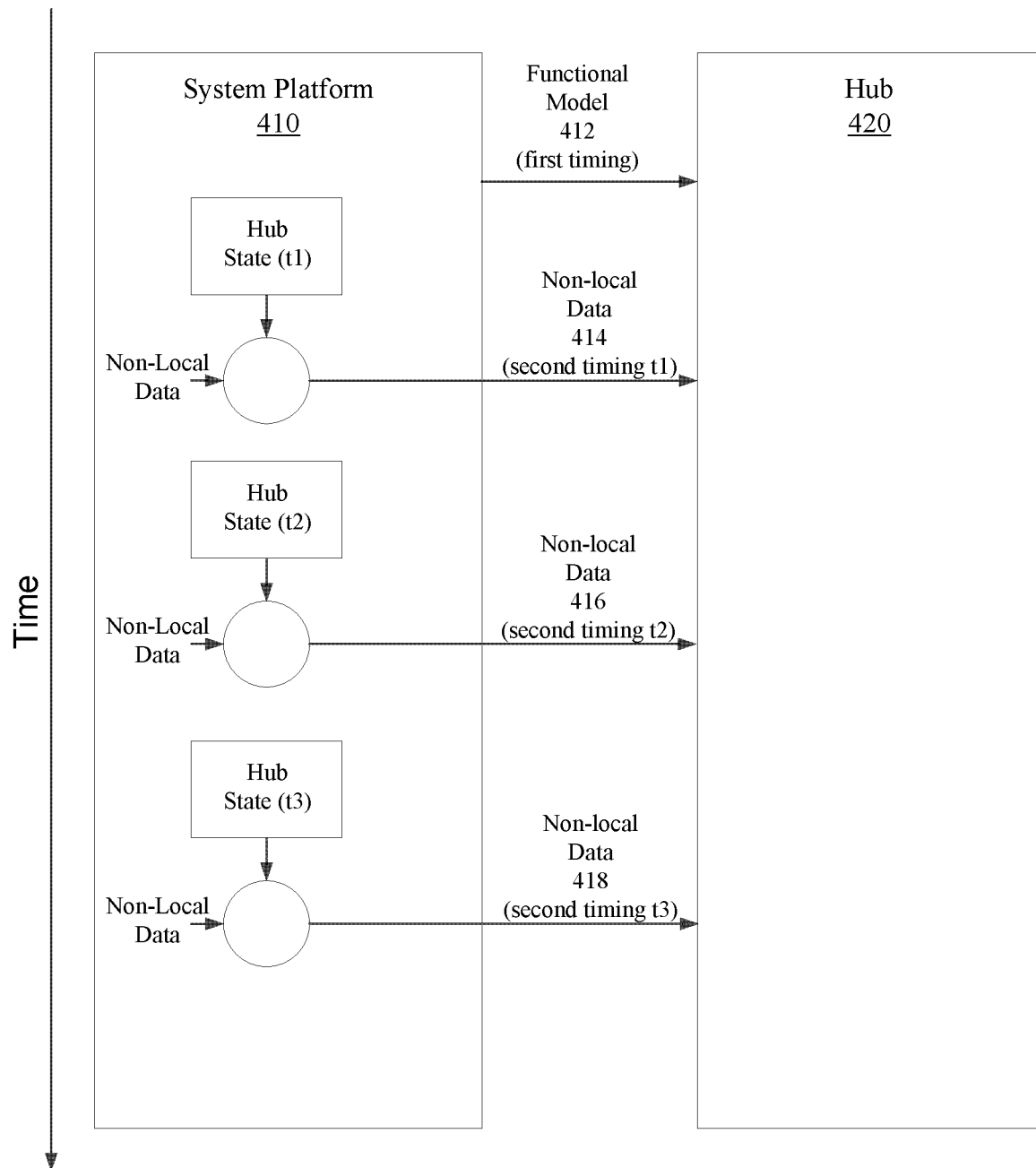
FIG. 4 shows a system platform providing a functional model to a hub at a first timing, and providing non-local data to the hub at second timings, according to an embodiment.

FIG. 4 shows a system platform 410 providing a functional model 412 to a hub 420 at a first timing, and providing non-local data to the hub 420 at second timings, according to an embodiment. As previously described, the system platform 410 determines the functional mode 412 based at least one local data and outside data. Further, the system platform determines the non-local data 414 base at least on the local data and the outside data, and further base on at least one of a location of the hub, a time, and/or an application of the hub.

As shown and described, the system platform 410 provides the functional model to the hub(s) 420 at a first timing 412. As described, for an embodiment, the first timing occurs during an initial hub provisioning. That is, for example, when a user of the hub is first deploying the hub, the system platform provides the functional model to the hub. For an embodiment, the first timing additionally or alternatively occurs when significant changes have occurred to features of the function models. For example, a system platform that provides a functional model to a hub that is deployed in the field of a farmer may detect a significant change as a transition from summer to winter for an agricultural irrigation model (for example, the soil is not dry, but rather, the soil is frozen). For an embodiment, as long as provided inputs are within a domain of the learned model no update to model is required. If an input falls outside of that domain, a new functional model may be needed.

As previously described, the functional model may be provided to one or more hubs through a multicast from a base station. For an embodiment, the multicast is over a wireless satellite link. For an embodiment, a multicast with the functional model is performed when greater than a selected threshold number of hubs are to be updated. For another embodiment, the functional model is provided to one or more hubs through the previously described hub profiles.

As shown and described, the system platform provides the non-local inputs (data) 414, 416, 418 to the hub(s) at one or more second timings t1, t2, t3. For an embodiment, the second timings include a routine or periodic transmission of the non-local inputs. For an embodiment, the second timing is adaptively determined. For an embodiment, the period of the second timing is adaptive. For at least some embodiments, the second timing is adaptive based on a hub state including one or more of conditions (environmental) of the hub, a location of the hub, an application the hub serves, and/or a timing of sensing of the local data of the hubs.

Further, for an embodiment, the periodicity of the second timing changes or evolves as a function of time (for example, the non-local inputs provided for updating soil moisture readings occur much more frequently while the sun is up). Further, for an embodiment, the periodicity evolves based on the location of the hub(s).

For an embodiment, different non-local inputs are transmitted at different intervals (different second timings) based upon applications operating on the hub(s). For example, the hub may be located on a fishing boat, and include a fishing application. For this application, a non-local input that reflects a wave height forecast is transmitted once every hour, wherein a non-local input that includes the price of Cod may be transmitted once every day.

For an embodiment, transmission of non-local input is updated at a frequency that is tuned to correlate with a frequency in which local input (sensed input) is updated. That is, for example, a central server of a system platform may transmit non-local data at an update frequency that is tuned to match an update frequency of the local sensor data included in the functional model. For an embodiment, if a functional model requires 5 inputs, (2 local, 3-nonlocal) the non-local refresh rate is not faster than the local refresh rate, as all variables are required for model execution.

For an embodiment, if a hub does not receive an update to a non-local input, the hub assumes the value of the non-local input is the same as previously received.

For at least some embodiments, the non-local inputs include sensed and synthesized data. The sensed data may directly include local sensor data, or include an aggregate of local sensor data from the plurality of hubs, or may be directly sensed data from outside data sources. For an embodiment, the synthetic data includes extrapolated data based upon available data sources (aggregate local, and outside data sources) in proximity (time, space, and/or application) to the recipient hub. The synthetic data can include, for example, an interpolation of soil nitrogen levels over a region, or wave height over a region based upon geographical similar sensors.

Figure 5:
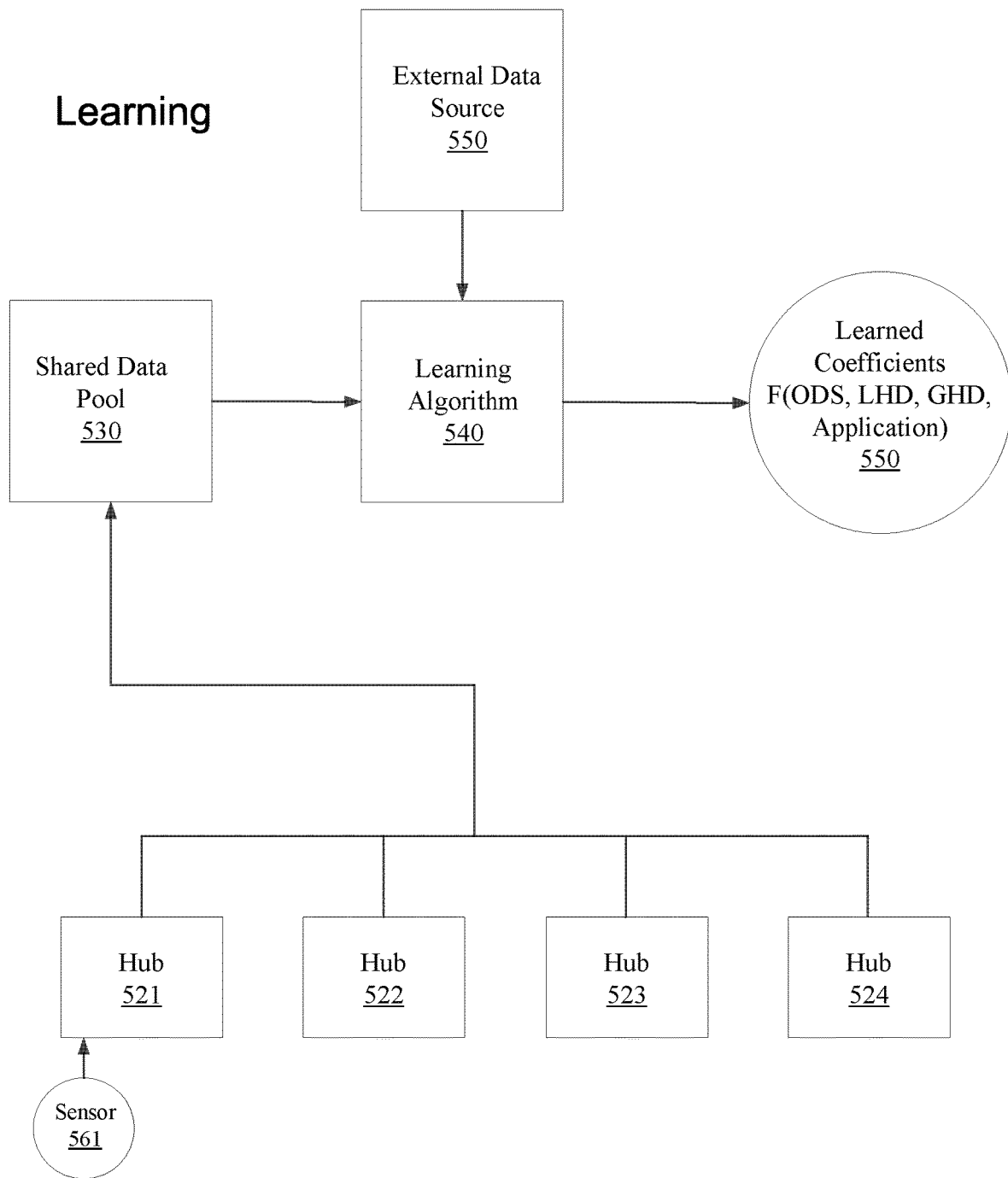
FIG. 5 shows a plurality of hubs reporting sensed local information to a system platform, and the system platform generating a learned functional model, according to an embodiment.

FIG. 5 shows a plurality of hubs reporting sensed local information to a system platform, and the system platform generating a learned functional model, according to an embodiment. As shown, a plurality of hubs 521-524 sense local data which is collected and stored within a shared data pool 530. Further, a learning algorithm 540 of the system platform generates the functional model(s) and the non-local inputs based on at least the local data stored information stored in the shared data pool 530 and external source data 550. The learning algorithm generates learned coefficients that represent the functional model(s). For an embodiment, the learned coefficients are a function of an outside data source (ODS) which includes non-local inputs provided to the hub by the system platform, Global Hub Data (GHD) which includes local hub data of other hubs provided to the hub by the system platform, and Local Hub Data (LHD) which includes local input provided local at the edge by the hub.

For an embodiment, the learned coefficients compose the functional model. For an embodiment, the values of the learned coefficients are continuously optimized/improved (learned) as new data is made available or as the environment changes. For an embodiment, the functional model is not continuously transmitted to the hubs. For an embodiment, the functional model is only transmitted when there are significant changes to the model (for example, the environment has significantly changed).

Figure 6:
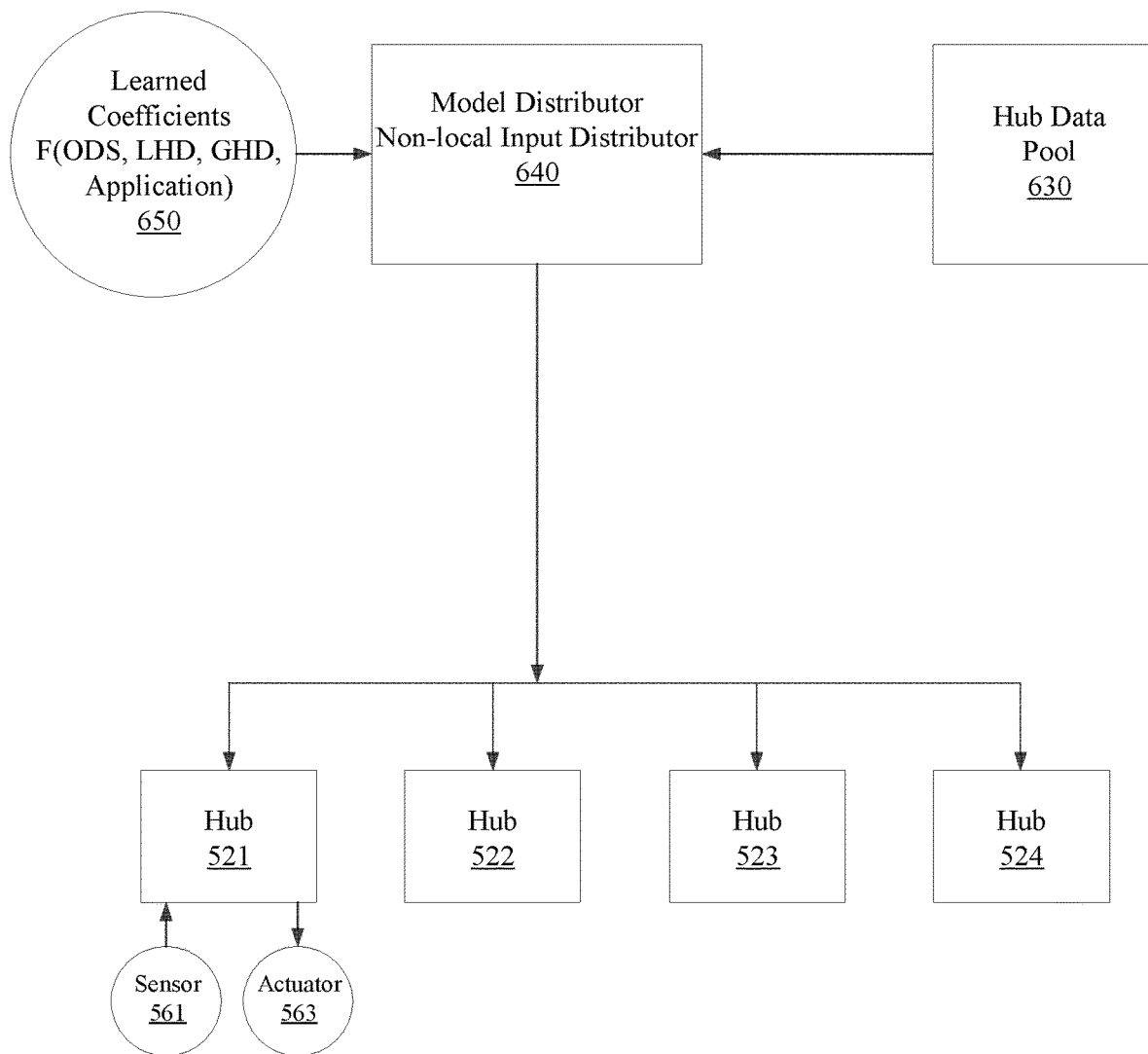
FIG. 6 shows a system platform providing a learned functional model and non-local inputs to a plurality of hubs, according to an embodiment.

FIG. 6 shows a system platform providing a learned functional model and non-local inputs to a plurality of hubs, according to an embodiment. For an embodiment this includes the system platform providing the learned coefficients 650. A model distributor and non-local input distribution 640 receives the learned coefficients and distributes ODS and GHD (that is, non-local variables) and characteristics of the hubs from a hub data pool 630. For an embodiment, when a hub connects to the system platform, the hub coordinates with the system platform to receive the non-local inputs required for the learned model that the hub received from the system platform and is running. For an embodiment, the non-local inputs are provided at the second timing based at least in part on the characteristics of the hubs. Further, as previously described, the first timing of transmission of new model coefficients of the functional model is only being performed when significant changes to the hub environment have occurred.

It is to be understood that the non-local inputs are provided to the hubs as inputs to the functional models. As previously stated, the non-local inputs are provided at a second timing, and dynamically change, whereas the learned coefficients of the functional models are relatively static (change much less often) than the non-local inputs.

Figure 7:
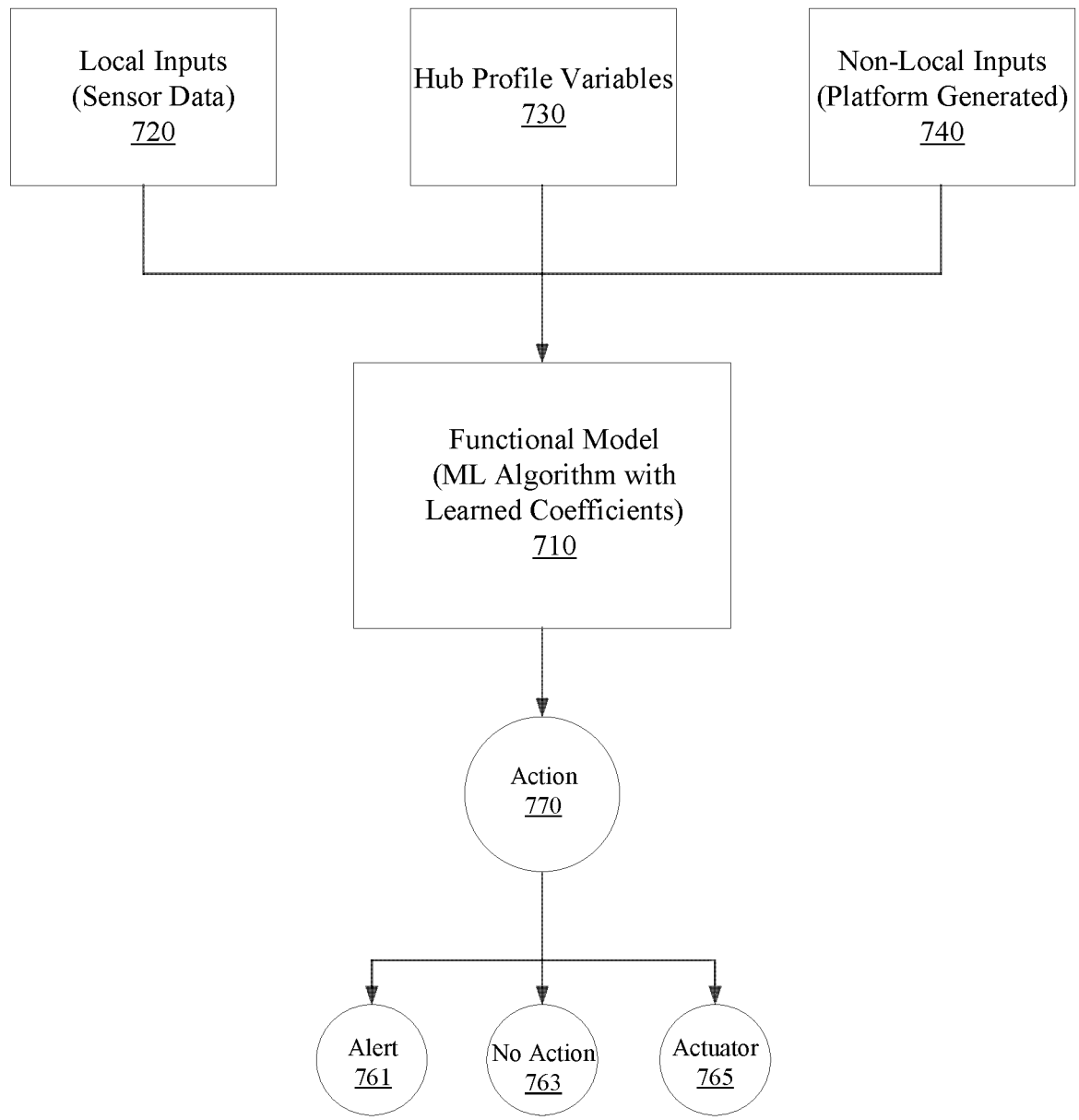
FIG. 7 shows a block diagram of a hub determining an action based on a functional model receiving local inputs, a hub profile, and non-local inputs, according to an embodiment.

FIG. 7 shows a block diagram of a hub determining an action (or inaction) based on a functional model 710 receiving local inputs 720, a hub profile 730, and non-local inputs 740, according to an embodiment. At least some embodiments include one or more of the plurality of hubs generating an output based on the application of the current locally sensed data and the dynamically transmitted non-local inputs to the created function models. At least some embodiments further include the one or more or the plurality of hubs triggering an action based on the output. For an embodiment, the output affirmatively determines that an action is not to be taken.

For at least some embodiments, the hub profile includes hub profile variables. The hub profile variables may include a type of hardware, availability of onboard sensors, calibration data for the onboard sensors, operating condition of the hub as specified in the hub profile, and/or an application of the hub as specified in hub profile.

FIG. 8 is a flow chart that includes steps of a method of providing function models to hubs to enhance operation of the hubs, according to an embodiment. A first step 810 includes sensing, by a plurality of hubs, local data, wherein the local data is sensed by one or more sensors associated with the plurality of hubs. A second step 820 includes collecting, by a system platform, the local data from the plurality of hubs. A third step 830 includes creating, by the system platform, function models based on the collected local data and outside data collected from outside data sources. A fourth step 840 includes dynamically creating, by the system platform, non-local inputs for each of the plurality of hubs based upon the local data from the plurality of hubs and the outside data collected from outside data sources. Further, at least one of a location of the hub, a time, and/or an application the hub serves can be used in the determination of the non-local inputs. A fifth step 850 includes transmitting the created function models to the plurality of hubs at a first timing, and dynamically transmitting the non-local inputs to each of the plurality of hubs at a second timing based on the location of the hub, the time, and the application the hub serves. A sixth step 860 includes applying, by one or more of the plurality of hubs, current locally sensed data and the dynamically transmitted non-local inputs to the created function models.

A previously described, for an embodiment, the system platform includes a centralized server which collects data from hubs and outside data source. Further, for an embodiment, the platform server performs machine learning (ML), model creation, non-local variable creation, and initiates transmission of both function models and non-local variables to hub.

As previously described, the function model includes a generic or bespoke model which maps an input(s) to an output for execution on a hub. For example, f(x)=Ax is a simple mode, where f(x) is the model, A, is a learned variable based upon data, where the structure Ax was based upon the features of the problem, and where x is an input (either local or non-local). For an embodiment, the functional models may be part of firmware, may be part of general hub profile, or may be standalone (not embedded in either firmware distribution or hub profile distribution.

For at least some embodiments, the local inputs include data collected from sensors in local (spatial) proximity to the hub. It is to be understood that proximity can vary by location. For an embodiment, proximity is defined by a distance threshold. For an embodiment, the local data is communicated with the hub over local networks (such as, direct (wireless or non-wireless link) and is not communicated through a backhaul infrastructure.

For at least some embodiments, the non-local inputs include data collected, or synthesized, from aggregate local data and outside data sources by the system platform. As described, the non-local inputs are transmitted from the system platform to the hub.

As previously described, an embodiment further includes generating, by one or more of the plurality of hubs, an output based on the application of the current locally sensed data and the dynamically transmitted non-local inputs to the created function models. For an embodiment, an action is triggered by the one or more or the plurality of hubs based on the output. For another embodiment, no action is affirmatively determined not to be performed based on the output.

As previously described, for at least some embodiments, the first timing occurs during an initial hub provisioning. That is, for example, when a user of the hub is first deploying the hub, the system platform provides the functional model to the hub. As previously described, for at least some embodiments, the first timing occurs when significant changes have occurred to features of the function models. As previously described, for example, a system platform that provides a functional model to a hub that is deployed in the field of a farmer may detect a significant change as a transition from summer to winter for an agricultural irrigation model (for example, the soil is not dry, but rather, the soil is frozen). For an embodiment, as long as provided inputs are within a domain of the learned model no update to model is required. If an input falls outside of that domain, a new functional model may be needed.

As previously described, the system platform provides the non-local inputs (data) to the hub(s) at a second timing. For an embodiment, the second timing includes a routine or periodic transmission of the non-local inputs. For an embodiment, the second timing is adaptively determined. For an embodiment, the period of the second timing is adaptive. For at least some embodiments, the second timing is adaptive based on one or more of conditions (environmental) of the hub, a location of the hub, an application the hub serves, a timing of sensing of the local data of the hubs. For an embodiment, the second timing includes multiple transmissions of the non-local inputs over time. That is, the second timing(s) of the transmission of the non-local input are continuously transmitted over time either periodically and/or adaptively.

Further, for an embodiment, the periodicity of the second timing changes or evolves as a function of time (for example, the non-local inputs provided for updating soil moisture readings occur much more frequently while the sun is up). Further, for an embodiment, the periodicity evolves based on the location of the hub(s).

As previously described, for an embodiment, different non-local inputs are transmitted at different intervals based upon applications operating on the hub(s).

As previously described, for an embodiment, transmission of non-local input is updated at a frequency that is tuned to correlate with a frequency in which local input (sensed input) is updated. That is, for example, the system platform may transmit non-local data at an update frequency that is tuned to match an update frequency of the local sensor data included in the functional model.

As previously described, for an embodiment, if a hub does not receive an update to a non-local input, the hub assumes the value of the non-local input is the same as previously received.

As previously described, at least some embodiments include scheduling transmission of the second timing(s) of the non-local inputs as scheduled multicast transmissions that are coordinated with sleep schedules of the hubs. That is, for some embodiments, the hubs only receive sensed data intermittently and the functional models provided to the hubs only need to generate an action or inaction determination intermittently. Accordingly, power consumption of the hubs can be moderated (reduced) by de-activating the hubs into power savings modes for periods of time in which the hubs are inactive. For an embodiment, power saving is achieved by providing the hubs with schedules that include periods of deactivation (sleep mode) of the hubs, and periods in which the hubs are to received scheduled multicast transmission at the second timings that include the non-local inputs to the functional models.

A previously described, for an embodiment, when a hub receives non-local inputs through a multicast transmission, the hub provides a response (for example, as an output of the functional model) to the non-local inputs received through the multicast transmission using a directed random-access channel (RACH). For an embodiment, when a hub receives non-local inputs through a multicast transmission, the hub provides a response (for example, as an output of the functional model) to the non-local inputs received through the multicast transmission at a predetermined time offset, and frequency/preamble as described by a a-priori coordinated hub profile. Accordingly, the described embodiments provide a low energy/spectrally efficient machine learning satellite IoT network.

As previously described, for at least some embodiments, the non-local inputs include sensed and synthesized data. The sensed data may directly include local sensor data, or include an aggregate of local sensor data from the plurality of hubs, or may be directly sensed data from outside data sources. For an embodiment, the synthetic data includes extrapolated data based upon available data sources (aggregate local, and outside data sources) in proximity (time, space, and/or application) to the recipient hub.

For an embodiment, the action includes one or more of triggering an actuator, or sending a message. For an embodiment, the output affirmatively determines that an action is not to be taken. For example, a determined inaction may include determining not to engage an irrigation system because the non-local input, such as, a forecast indicates rain as in-route in 4 hours and local input (soil moisture) says current situation is not dire.

An embodiment further includes providing, by two or more of the plurality of hubs, feedback to the system platform a level of success of the created function models when receiving the local and the non-local inputs, and updating, by the system platform, the created function models based on the feedback provided by the two or more of the plurality of hubs. That is, functional models that have been distributed in the field (to hubs) are utilized by application of current local data and the non-local inputs also provided by the system platform to the functional models. Outputs of the provided functional models can be evaluated to determine how well the functional models perform. For an embodiment, the hubs articulate how successful the functional models are performing a desired function when both the local inputs and non-local inputs are applied to the functional models. This information is shared with the system platform, and the system platform can then adjust weights of the functional models based on information learned from successful versus less successful hubs. At least some embodiments include using future sensed local data to determine an efficiency or success of an action or a functional model. At least some embodiments further include collecting direct user feedback via a web interface. For at least some embodiment, the hubs provide error and/or success metrics based upon sensor data to the system platform to provide sharing of the feedback with learning algorithm.

Alternatively, for an embodiment, the hubs update the functional models and feedback the updated functional models. For an embodiment, this includes determining, by the system platform, which of the two or more of the plurality of hubs provides a better updated at least one of the complex function models, and transmitting, by the system platform, the better updated at least one of the complex function models to other of the plurality of hubs.

For an embodiment, transmitting the functional models includes a base station connected to the system platform multicast transmitting the complex function models to the plurality of hubs. For an embodiment, the multicast transmission of the function model is triggered when a certain threshold of affected hubs needs new functional models. For at least some embodiments, multicast for distribution of functional models to hubs from the system platform is more likely with a global or regional environment change as opposed to changes at specific hubs.

At least some embodiments include generating, by the system platform, a multicast scheduling control packet based upon a distribution of a plurality of network registered hubs, and communicating, by the system platform, to a wireless communication base station the multicast scheduling control packet.

For at least some embodiments, the distribution of the plurality of network registered hubs is determined based on a data package of the non-local inputs associated with each of the plurality of network registered hubs. For at least some embodiments, hubs opt into receive non-local data transmitted over multicast based upon the deficiency of locally available data types against the data types required by the model. For example, a functional model may require inputs A, B, and C, where A and B are local, and the hub opts into multicast transmission of C.

For at least some embodiments, the distribution of the plurality of network registered hubs is determined based on specific functional models and data package of the non-local inputs being provided to each hub of the plurality of network registered hubs.

At least some embodiments further include informing, by the system platform, the hub when to receive multicast transmission of the non-local inputs. For an embedment, the functional model is included as a part of hub profile downloaded to hub. For an embodiment, the hub profile informs hub when to listen to the multicast channel to receive non-local variable(s).

At least some embodiments further include requesting, by at least one of the plurality of hubs, an updated functional model when current sensor data is outside of a valid domain of a current functional model. For an embodiment, the hubs are informed what the valid domain is from system platform, or hub may make its own determination on what is a valid domain.

Figure 9:
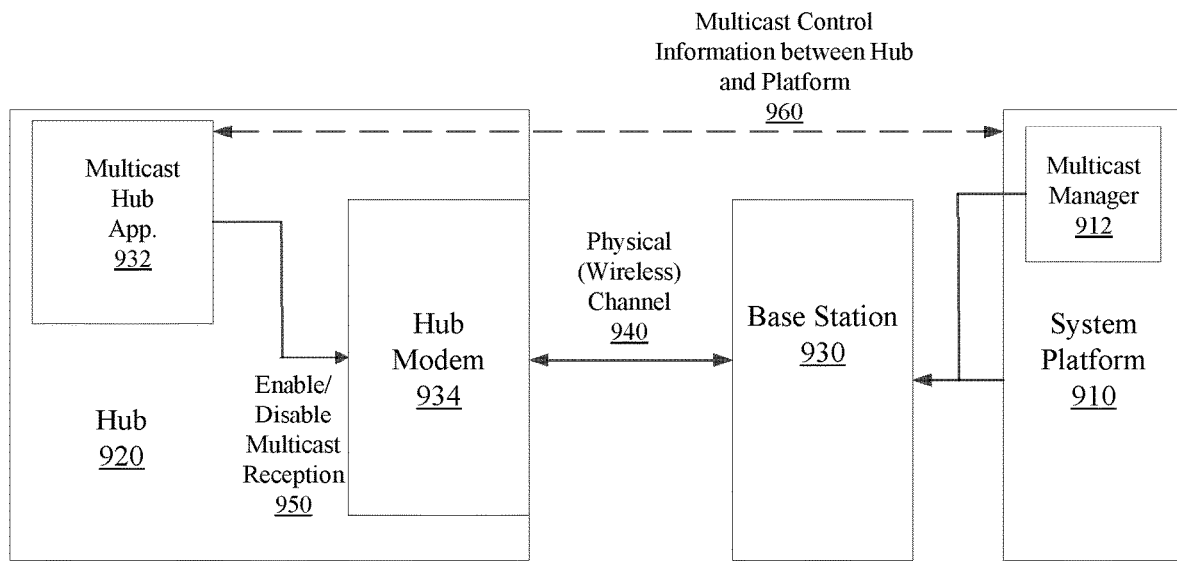
FIG. 9 shows a physical channel between a hub modem of a hub and a base station, and a virtual channel between the hub and a system platform, according to an embodiment.

FIG. 9 shows a physical channel 940 between a hub modem 934 of a hub 920 and a base station 930, and a virtual channel 960 between an application 932 of the hub 920 and a system platform 910, according to an embodiment. For an embodiment, a multicast manager 912 of the system platform 910 generates a multicast scheduling control packet based upon a distribution of a plurality of network registered hubs. The distribution of the network registered hubs can be based on a distribution of functional models of the network registered hubs, a distribution of non-local inputs of the hubs, a distribution of firmware operating on the hubs, a distribution of customers of the hubs, a distribution of application of use of the hubs, and/or based on a distribution of the geography of the hubs.

For an embodiment, the system platform 910 communicates the multicast scheduling control packet to the base station 930. For an embodiment, the base station 930 generates a plurality of multicast channel configurations based upon the multicast scheduling control packet.

Further, for an embodiment, system platform 910 also communicates the multicast scheduling control packet to the wireless communication hub 934, wherein the wireless communication hub 934 is one of the plurality of network registered hubs. For an embodiment, the system platform 910 communicates the multicast scheduling control packet to the wireless communication hub 934 through the base station 930. However, the multicast scheduling control packet does not have to be communicated to the wireless communication hub 934 through the base station 930. That is, for example, the system platform 910 may communicate the multicast scheduling control packet to the wireless communication hub 934 through another means. For example, a cellular or other wireless network (not shown in FIG. 9) can be utilized to facilitate this communication.

After having received the multicast scheduling control packet from the system platform 910, the wireless communication hub 934 selects specific multicast channels from the plurality of multicast channel configurations, to receive specific multicast data based upon a condition of the hub and the multicast scheduling control packet. That is, the multicast scheduling control packet includes multicast channel configurations of which the wireless communication hub 934 makes a selection. For an embodiment, the selection is based on a condition of the wireless communication hub 934, wherein the condition is based on a configuration of the wireless communication hub 934 or an environment of the wireless communication hub 934. For an embodiment, the configuration includes a functional model and/or non-local inputs of the hub. For at least some embodiments, the configuration includes a current firmware version of the hub. For at least some embodiments, the configuration includes a hub battery status. For at least some embodiments, the configuration includes a subscription of the hub of certain multicast services. For at least some embodiments, the configuration includes a customer ID of the hub. For at least some embodiments, the configuration includes a multicast channel priority specified in the multicast channel configuration. For at least some embodiments, the environment includes a location of the hub.

After having selecting the specific multicast channels, the wireless communication hub 934 then receives the multicast data through the selected specific multicast channel configurations.

FIG. 10 show examples of multicast scheduling control packet generated by a system platform, according to an embodiment. For at least some embodiments, the multicast scheduling control packet is an application layer data packet produced by the system platform based upon network traffic distributions that defines a dictionary of wireless hub groups and defines when and with which coded multicast data is transmitted. A first exemplary multicast scheduling control packet 1010 includes a dictionary of groups of hubs 1, 5, 6, a timing (timing offset of 10 frames and periodicity of 5 hyper frames), and a code RNT1. A second exemplary multicast scheduling control packet 1020 includes a dictionary of groups of hubs 10, 8, 6, a timing (timing offset of 5 frames and periodicity of 1 hyper frame), and a code RNT1. That is, as shown, the exemplary multicast scheduling control packets 1010, 1020 include group identifiers, a time offset in frames, a periodicity in frames, a type of scrambling code.

As previously described, the base station 930 generates a plurality of multicast channel configurations based upon the multicast scheduling control packet, and the hub 934 selects specific multicast channels from the plurality of multicast channel configurations to receive specific multicast data based upon a condition (configuration or an environment) of the hub and the multicast scheduling control packet. For an embodiment, the multicast channel configurations include or define the time, frequency, or code. Further, for at least some embodiments, the multicast channel configurations include additional parameters such as repetition of multicast transmissions, and/or and MCS (modulation and coding scheme). As shown and described, for an embodiment, time allocations of the multicast channel configurations are communicated to the hub through a time (frame) offset and periodicity (repeating every N frames).

For at least some embodiments, the multicast control packet is generated based on a network traffic distribution of the plurality of registered hubs. For an embodiment, a time allocated to a multicast transmission is adapted based upon network traffic. For example, during periods of light network traffic (for example, at night), more time may be allocated to multicast transmission. Further, multicast transmission may be reduced when, for example, a ucast traffic load of the network traffic distribution is greater than a threshold value.

As stated, for an embodiment, there is a distribution of firmware versions of the registered hubs. Further, for an embodiment, there is a distribution of device connectivity timings of the registered hubs. For an embodiment, the multicast assignment of channels of the multicast control packet is based upon the product of the distribution of firmware versions of the registered hubs and the distribution of device connectivity timings of the registered hubs. Further, for an embodiment, there is a distribution of device characteristics (battery status, location, device speed, etc.) of the registered hubs. For an embodiment, the multicast assignment of channels of the multicast control packet is based upon the product of the distribution of device characteristics of the registered hubs and the distribution from device connectivity timings of the registered hubs.

As described, the hub 920 selects specific multicast channels from the plurality of multicast channel configurations. This includes the selection of specific multicast channel configurations from the plurality of multicast channel configurations. As previously described, for an embodiment, the selection is based on a condition of the wireless communication hub 920, wherein the condition is based on a configuration of the wireless communication hub 920 or an environment of the wireless communication hub 920.

As previously described, for an embodiment, a multicast manager 912 of the system platform 910 generates a multicast scheduling control packet based upon a distribution of a plurality of network registered hubs. For an embodiment the distribution of the plurality of registered hubs includes a distribution of versions of firmware of the plurality of registered hubs. That is, multiple versions of firmware for the hubs can simultaneously exist and be deployed on hubs in the field. Some versions may be more highly distributed than other versions. For an embodiment, updates to the firmware merely includes the difference between the deployed firmware and the current version to minimize the amount of data being wirelessly transmitted. Accordingly, versions of the deployed firmware with the most distribution can be allocated a greater amount of channel capacity. For at least some embodiments, time, code, and frequency allocations of the multicast channel configurations are proportionally allocated to different of the plurality of wireless communication hubs based on the distribution of firmware versions amongst the plurality of wireless communication hubs.

For at least some embodiments, the distribution of firmware versions varies based on an application of a customer who controls the hub. For at least some embodiments, the distribution of firmware versions varies based on a geography of hubs. At least some embodiments include continuously updating, by the system platform, the current firmware of each of the plurality of hubs. At least some embodiments include determining, by the hub, one or more missing firmware segments after a period of time, and requesting a unicast transmission of the missing firmware segments from the base station. At least some embodiments include determining, by the system platform, a preferred time of day for firmware updates based on past hub availability statistics For an embodiment, a one of the plurality of multicast channel configurations is selected for each of a plurality of hubs based on a current firmware version operating on each of the plurality of hubs.

At least some embodiments include the hub entering a sleep state during time allocations of the plurality of multicast channel configuration that the hub does not select for receiving multicast data.

As previously described, for an embodiment, the one or more of the of the plurality of multicast channel configurations further include scrambling codes. For an embodiment, the scrambling codes are defined by an RTNI (radio network temporary identifier). For an embodiment, the scrambling codes specify coding of the multicast information (multicast downlink control information). Hubs that are to receive the multicast transmissions are able to descramble the received multicast transmissions.

For an embodiment, the one or more of the of the plurality of multicast channel configurations further include security/encryption keys. Since the multicast channel configuration is already communicated via a secured unicast channel, the multicast channel configuration may also carry an encryption key.

For an embodiment, each of the plurality of multicast channel configurations includes a RTNI (radio network temporary identifier) dedicated for a multicast channel. The RNTIs are radio network temporary identifiers used to identify one radio channel from another. NBIoT (Narrow Band Internet of Things) has a limited set of RNTIs, in which some RNTIs are reserved for specific usages. For an embodiment, a subset of the available RNTIs are reserved for the system platform 910 (and manager 912) so that system platform 910 can use the reserved RNTIs for assigning multicast channels for multicasting packets from the base station 930 to the hub modem 934 of the hub 920. For an embodiment, the reserved set can be referred as multicast RNTIs. For an embodiment, the system platform 910 (and manager 912) configure the multicast channel by allocating different RNTI's from this reserved set to different multicast channels. For an embodiment, the multicast channel configurations also include resource allocation for downlink control information transmission along with a multicast transmission period. At least some embodiments include a subset of multicast channel configurations wherein multicast data is semi-statically scheduled on a predetermined set of resources without any associated DCI for the multicast data (as is done for Broadcast transmission). For an embodiment, the base station 930 periodically transmits multicast downlink control information (DCI) packets using the resources specified by system platform 910. For an embodiment, the multicast transmission period can be defined by a starting point of a hyper-frame and by a number of hyper-frames between consecutive multicast DCI transmissions.

For at least some embodiments, the multicast channel configuration includes a frequency and time slot for the downlink control information, and the RNTI is used to scramble the downlink control information. For an embodiment, the downlink control information includes a schedule for the following multicast packets. For an embodiment, the downlink control information includes an N, Y, and Z, wherein N is the total number of multicast packets included within a frame, Y is a separation in frames between each multicast packet, and Z is an offset in frames of a first multicast packet in frames. For an embodiment, the downlink control information is generated by the base station based on the multicast channel configuration and multicast packets received from system platform. For an embodiment, the base station can decide the schedule of multicast packets based on number and size of multicast packets received from the system platform. For an embodiment, the system platform also sends frequency and time slots for the downlink control information and the RNTI used to scramble downlink control information to the hub as part of the multicast channel configuration. For an embodiment the hub receives the multicast downlink control information using the multicast channel configuration.

For an embodiment, the downlink control information (DCI) includes a schedule for multiple downlink data packets. For an embodiment, CRC (cyclic redundancy) bits of the downlink control information packets are scrambled using the RNTI allocated for multicast channel. For an embodiment, since the RNTIs are used to scramble the DCI, the RNTIs may also referred as a scrambling code. For an embodiment, the hub 920 (through the hub modem 934) receives multicast packets using the multicast RNTI and resource configuration received from platform. Optionally, for an embodiment, the multicast channel configuration provided by platform also includes number of multicast packets scheduled by single multicast DCI.

For an embodiment, the hub 920 operates to receive through the hub modem 934 multicast packets from the wireless communication base station during time slots as defined by the specified resource timing of the one or more of the plurality of multicast channel configurations. For an embodiment, the multicast packets are transmitted by the wireless communication base station during time slots and using scrambling codes as defined by the specified resource timing and scrambling codes of the one or more of the plurality of multicast channel configurations.

For at least some embodiments, the system platform further operates to assign a one of the plurality of multicast channel configurations to each of a plurality of hubs based on a use of the plurality of hub or a tenant of the plurality of hubs, wherein the use of tenant is defined by a customer account. For example, if a tenant has 1000 hubs, then all those 1000 hubs can be assigned same multicast channel configuration. That is, a commonality between the different hubs, such as, the same customer account or same tenant can be used for the selection of a common multicast channel configuration for the different hubs. Further, for an embodiment, the multicast channel configuration can be assigned to multiple different hubs based on a commonality of use. For example, a common or same multicast channel configuration can be assigned to multiple hubs that have been designated as servicing fisheries (common use).

For at least some embodiments, the system platform further operates to assign a one of the plurality of multicast channel configurations to the hub based on a current firmware version operating on the hub. That is, the current firmware operating on the hub and the required additional firmware information needed to update the hub is used in selecting the one of the plurality of multicast channel configuration to be used in multicasting the firmware update.

As described, generally the system platform (multicast manager 912) 910 manages the updating of multiple hubs. Accordingly, for at least some embodiments, the system platform operates to assign a one of the plurality of multicast channel configurations to each of a plurality of hubs based on a current firmware version operating on each of the plurality of hubs. For at least some embodiments, multiple versions of firmware can be operating on different of many different hubs. That is, for example, there could be 5 different firmware versions running on different hubs in the network. Therefore, there will be 5 different delta image versions. For at least some embodiments, the system platform operates to coordinate with hubs in mass (depending upon firmware statistics and distributions) different configurations for multiple multicast channel configurations.

For at least some embodiments, based on the distribution of the firmware version used by the hubs, system platform identifies firmware versions that have higher distribution than other firmware versions, and prioritizes and creates the multicast channels to update those firmware versions. For a least some embodiments, the system platform also identifies and prioritizes firmware versions based on a criticality of fixes available in firmware updates (delta) and create multicast channels to update those firmware versions. The higher priority assigned to a hub based on the version of the firmware operating on the hub, the higher the priority the system platform multicast assigns channel allocations to the hub within the multicast scheduling control packet. That is, the timing and amount of channel allocations allocated to the hub are selected based on the priority (higher or lower) assigned to the hub.

At least some embodiments include continuously updating, by the system platform, the current firmware of each of the plurality of hubs. That is, the updating the firmware and firmware updates are constantly being streamed through the multicast broadcasts to maintain updating of the hubs supports by the system platform. That is, the updates can occur 24 hours a day, 7 days a week.

At least some embodiments include determining, by the hub, one or more missing firmware segments after a period of time, and requesting a unicast transmission of the missing firmware segments from the base station. That is, the hub may wait for the update from the continuous updating provided by the system platform. For an embodiment, the hub may wait for one or more updating cycles, and if the hub determines it is not getting the updates it needs, the hub can proactively request an update.

For at least some embodiments, the system platform further operates to enable or disable one or more of a plurality of hubs, whereby when disabled the one or more of the plurality of hubs do not receive multicast packets transmitted using the plurality of multicast channel configurations. The enable/disable functionality can be dynamic by dynamically updating a radio network temporary identifier which puts the hub modem 934 into a sleep mode or dictates that the hub modem 934 operate in a deaf mode in which no software updates are performed. For an embodiment, the one or more of the plurality of hubs are disabled by removing/changing the specified resource timing or scrambling codes.

For an embodiment, the system platform 910 can also dynamically enable/disable 950 or control a firmware update by providing the required firmware version information to hub 920. For an embodiment, multicast data packets received by hub 920 also include firmware update instructions and control information related to the firmware version available in the multicast channel. For an embodiment, the hub 920 uses that information to enable/disable 950 updates. For example, if the firmware version number in the multicast data packet indicates that a firmware update is firmware required for fisheries hubs, then the hubs which are used for agriculture can ignore the firmware update received. Further, for an embodiment, the system platform 910 divides the firmware updates into multiple segments and sends the different (multiple) segments through the multicast channel. For at least some embodiments, the firmware updates are divided into multiple segments, wherein a size of each of the multiple segments is determined or decided based on the resources allocated for multicast packets.

For at least some embodiments, multicast data packets transmitted using multicast channel configurations have two sections. For an embodiment, the two sections include a multicast packet header and multicast packet body. For an embodiment, the multicast header includes information regarding the multicast packet body. For example, when the multicast packet is used for firmware transmission, then the header can include a firmware version and segment number. For an embodiment, the hub uses the multicast packet header to accept/reject firmware received.

For an embodiment, the hub uses the firmware version and segment number to send Ack/Nack information to the system platform through the base station. For an embodiment, the system platform transmits the firmware segment for which Nack is received using either multicast channel configurations or existing NBIoT (narrow band internet of things) unicast channels.

For an embodiment, if Nack is received from multiple hubs for the same firmware segment then the system platform sends the same firmware update using the multicast channel. However, if Nack is received only from a few hubs then unicasts can be used.

For at least some embodiments, the system platform specifies a time of day for the multicast transmission based on an observed device availability pattern. For example, if from the data analysis it is observed that the probability of a device to be connected is highest between 8 am to 19 am, then system platform selects this time window for firmware segment retransmission.

For at least some embodiments, the system platform assigns different hub behaviors to different of the plurality of hubs. For an embodiment, at least one of the different behaviors require acknowledgements (ACKS) to be transmitted from a hub that is assigned a corresponding hub behavior upon receiving a multicast message. For an embodiment, the different behaviors are assigned based on an assigned channel or radio network temporary identifier (RNTI). For example, one RNTI invokes a required number of ACKs from the hub, and a different multicast RNTI does not.

For an embodiment, one hub behavior dictates that the hub response (transmit) an Ack (acknowledgement) for each of a plurality of the received firmware segments. For an embodiment, one hub behavior dictates that the hub response (transmit) a received Nack for missed segments. For an embodiment, one hub behavior dictates that the hub response (transmit) a Group Ack after receiving N number of FW segments.

For at least some embodiments, at least one of the different behaviors require the hub modify a sleep routine of the hub based on the at least one of the specified resource timing of the one or more of the plurality of multicast channel configurations to reception of the multicast packets by the hub.

For at least some embodiments, different behaviors are assigned to each of a plurality of hubs based on an assigned QoS (quality of service) of the hub. For at least some embodiments, the assigned hub behavior can depend upon the QoS of the hub. For example, some of the hubs can receive network services with better reliability than others based on the network plan associated with the hub. For an embodiment, the hub behavior can also be determined based on the importance of multicast data being transmitted to the hub over the multicast channels. For example, some of the multicast channels might require an Ack from each of the hub and some might not.

Figure 11A:
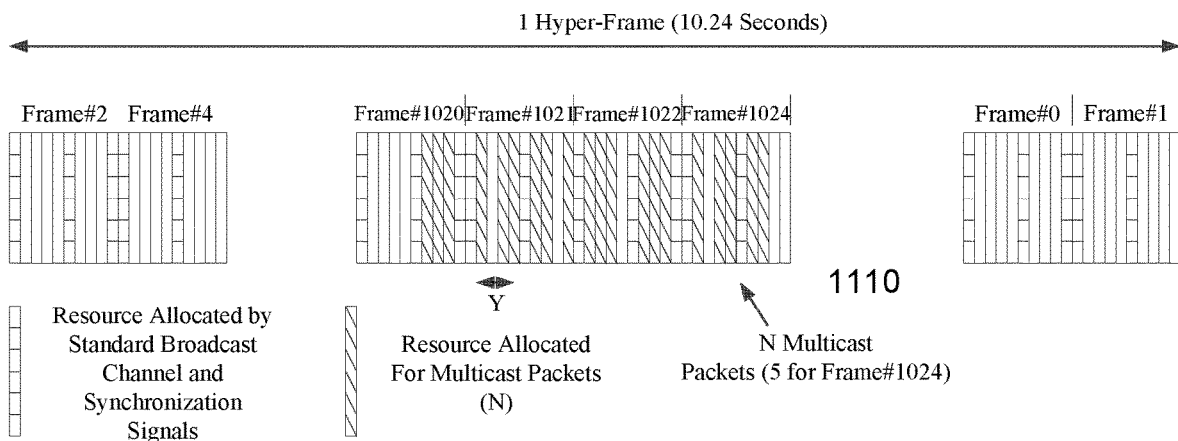
FIGS. 11A and 11B show hyper-frames of scheduled multicast packets, according to an embodiment.
Figure 11B:
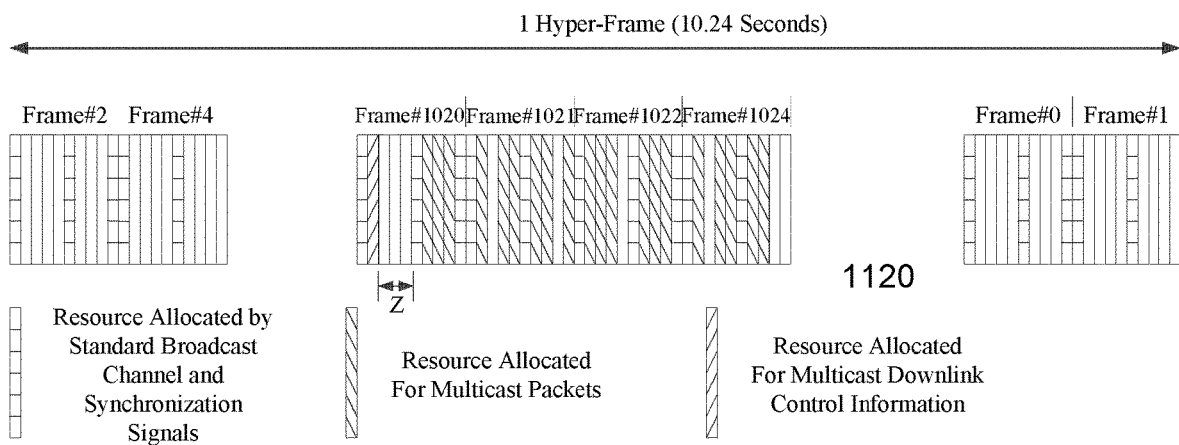

FIGS. 11A and 11B show hyper-frames 1110, 1120 of scheduled multicast packets, according to an embodiment. The hyper-frames 1110, 1120 include 1024 frames, and have a duration of 10.24 seconds. The frames (frame 0 through frame 1023) each include 10 time slots for packets. The hyper-frame 1110 of FIG. 11A includes a first type time slot that includes packets that include resources allocated by a standard broadcast channel and synchronization signals. A second type of time slot includes packets that include resources allocated for multicast packets. FIG. 11B shows a third type of time slot (shown, for example, as the first time slot of frame #1020) that includes packets that include resources allocated for multicast downlink control information (DCI).

For at least some embodiments, at least one of the specified resource timing of the one or more of the plurality of multicast channel configurations is assigned to each of a plurality of hubs, and the at least one of the specified resource timing repeats for each of a plurality of hyper-frame cycles 1110, 1120. For an embodiment, resources (time and frequency slots) for multicast channel are assigned such that they don't conflict with the standard defined broadcast channel and synchronization signals. Further, resources are scheduled for data transmission do not conflict with broadcast channels.

At least some embodiments include transmitting, by the base station, downlink control information (DCI) as specified by the specified resource timing of the one or more of the plurality of multicast channel configurations, wherein the downlink control information includes schedule for N downlink multicast packets. Here, N is the total number of multicast packets included within a frame. As shown, frame #1023 includes N=5 multicast packets.

For at least some embodiments, each multicast packet is separated by Y frames. Here, Y is an interval between consecutive multicast packets (1 in FIG. 11A).

For at least some embodiments, a first multicast packet is offset by Z frames. As shown in FIG. 11B, in frame #1020, Z=1.

For an embodiment, N, Y, Z are specified within the downlink control information. For an embodiment, N, Y, Z are specified by the multicast channel configuration.

For at least some embodiments, resources for multicast channel are assigned such that they don't conflict with the standard defined broadcast channel and synchronization signals.

For at least some embodiments, the system platform assigns a one of the plurality of multicast channel configurations to each of a plurality of hubs comprises assigning the one of the plurality of multicast channel configurations to each of the plurality of hubs based on a geography of the hub. For an embodiment, the geography of the hub provides global and regional multicast channel configurations. For an embodiment, every channel/base station uses the same global RNTI or scheduling information, such that mobility is no issue for hubs which roam between base stations.

FIG. 12 is a flow chart that includes steps of a method of configuring multicast IoT communication, according to an embodiment. A first step 1210 includes generating, by a system platform, a multicast scheduling control packet based upon a distribution (firmware, customer, application, geography, functional model, non-local inputs to the functional model) of a plurality of network registered hubs. A second step 1220 includes communicating, by the system platform, to a wireless communication base station the multicast scheduling control packet. A third step 1230 includes generating, by the wireless communication base station, a plurality of multicast channel configurations based upon the multicast scheduling control packet. A fourth step 1240 includes communicating, by the system platform the multicast scheduling control packet to a wireless communication hub, wherein the wireless communication hub is one of the plurality of network registered hubs. A fifth step 1250 includes selecting, by the wireless communication hub, specific multicast channels from the plurality of multicast channel configurations, to receive specific multicast data based upon a condition (a configuration or an environment) the hub and the multicast scheduling control packet. A sixth step 1260 includes receiving, by the wireless communication hub, multicast data through the selected specific multicast channel configurations.

As described, for an embodiment, the distribution of the network registered hubs can be based on functional models of the network registered hubs, or non-local inputs of the hubs, As described, for an embodiment, the distribution of the plurality of registered hubs includes a distribution of versions of firmware of the plurality of registered hubs. That is, multiple versions of firmware for the hubs can simultaneously exist and be deployed on hubs in the field. Some versions may be more highly distributed than other versions. For an embodiment, updates to the firmware merely includes the difference between the deployed firmware and the current version to minimize the amount of data being wirelessly transmitted. Accordingly, versions of the deployed firmware with the most distribution can be allocated a greater amount of channel capacity. For at least some embodiments, time, code, and frequency allocations of the multicast channel configurations are proportionally allocated to different of the plurality of wireless communication hubs based on the distribution of firmware versions amongst the plurality of wireless communication hubs.

For an embodiment, the distribution of firmware versions varies based on an application of a customer who controls one or more of the plurality of network registered hubs. For at least some embodiments, the distribution of firmware versions varies based on a geography of hubs. At least some embodiments include continuously updating, by the system platform, the current firmware of each of the plurality of hubs. At least some embodiments include determining, by the hub, one or more missing firmware segments after a period of time, and requesting a unicast transmission of the missing firmware segments from the base station. At least some embodiments include determining, by the system platform, a preferred time of day for firmware updates based on past hub availability statistics.

As described, for an embodiment, the multicast scheduling control packet is generated based on a network traffic distribution of the plurality of registered hubs. For an embodiment, a time allocated to a multicast transmission is adapted based upon network traffic. For example, during periods of light network traffic (for example, at night), more time may be allocated to multicast transmission. Further, multicast transmission may be reduced when, for example, a uncast traffic load of the network traffic distribution is greater than a threshold value.

As stated, for an embodiment, there is a distribution of firmware versions of the registered hubs. Further, for an embodiment, there is a distribution of device connectivity timings of the registered hubs. For an embodiment, the multicast assignment of channels of the multicast control packet is based upon the product of the distribution of firmware versions of the registered hubs and the distribution of device connectivity timings of the registered hubs. Further, for an embodiment, there is a distribution of device characteristics (battery status, location, device speed, etc.) of the registered hubs. For an embodiment, the multicast assignment of channels of the multicast control packet is based upon the product of the distribution of device characteristics of the registered hubs and the distribution of device connectivity timings of the registered hubs.

As described, for an embodiment, the plurality of multicast channel configurations comprises time, code, or frequency allocations for multicast data transmissions.

As described, for an embodiment, the wireless communication hub enters a sleep state during time allocations of the plurality of multicast channel configurations that the wireless communication hub does not select for receiving multicast data.

As described, at least some embodiments include enabling or disabling, by the system platform, one or more of a plurality of hubs, whereby when disabled the one or more of the plurality of hubs do not receive multicast packets transmitted using the plurality of multicast channel configurations.

As described, at least some embodiments include selecting the specific multicast channels based on a geography of the hub. For an embodiment, the geography of the hub provides global and regional multicast channel configurations. At least some embodiments include selecting the specific multicast channels based on one or more of time, location, market application, customer, device identification, subscription identification or a device state. For an embodiment, the device state includes a battery level of the device.

As described, at least some embodiments include coordinating by the wireless communication base station and the wireless communication hub, reservations of time slots to multicast data to mitigate the time slots from being used for other transmissions.

Although specific embodiments have been described and illustrated, the embodiments are not to be limited to the specific forms or arrangements of parts so described and illustrated. The described embodiments are to only be limited by the claims.

What is claimed:

1. A method, comprising:
sensing, by a hub, local data, wherein the local data is sensed by one or more sensors associated with the hub;
collecting, by a system platform, the local data from the hub;
creating, by the system platform, function models based on the collected local data and non-local data collected from non-local data sources;
dynamically creating, by the system platform, non-local inputs based upon the local data from the hub and the non-local data collected from non-local data sources;
transmitting the created function models to the hub at a first timing, and dynamically transmitting the non-local inputs to each of the hub at a second timing, wherein the first timing occurs when changes have occurred to features of the created function models, and wherein the second timing includes routine or adaptive transmission of the non-local inputs to the hub; and
applying, by the hub, current locally sensed data and the dynamically transmitted non-local inputs to the created function models.

2. The method of claim 1, further comprising:
sensing, by a plurality of hubs including the hub, the local data, wherein the local data is sensed by one or more sensors associated with the plurality of hubs;
collecting, by the system platform, the local data from the plurality of hubs.

3. The method of claim 1, further comprising:
generating, by the hub, an output based on the application of the current locally sensed data and the dynamically transmitted non-local inputs to the created function models;
triggering, by the hub, an action based on the output.

4. The method of claim 1, wherein the first timing additionally occurs during an initial hub provisioning.

5. The method of claim 1, wherein the non-local inputs include sensed and synthesized data.

6. The method of claim 3, wherein the action includes one or more of triggering an actuator, or sending a message.

7. The method of claim 1, further comprising:
providing, by two or more hubs, feedback to the system platform a level of success of the created function models when receiving the local and the non-local inputs;
updating, by the system platform, the created function models based on the feedback provided by the two or more hubs.

8. The method of claim 1, wherein transmitting the created function models comprises a base station connected to the system platform multicast transmitting the created function models to a plurality of hubs.

9. The method of claim 8, further comprising:
generating, by the system platform, a multicast scheduling control packet based upon a distribution of a plurality of network registered hubs; and
communicating, by the system platform, to a wireless communication base station the multicast scheduling control packet.

10. The method of claim 9, wherein the distribution of the plurality of network registered hubs is determined based on a data package of the non-local inputs associated with each of the plurality of network registered hubs.

11. The method of claim 10, wherein the distribution of the plurality of network registered hubs is determined based on specific functional models and data package of the non-local inputs being provided to each hub of the plurality of network registered hubs.

12. The method of claim 1, wherein the created function models are provided to one or more of a plurality of hubs including the hub through a hub profile generated by the system platform.

13. The method of claim 12, further comprising informing, by the system platform, the hub when to receive multicast transmission of the non-local inputs.

14. The method of claim 1, further comprising requesting, by the hub, an updated functional model when current sensor data is outside of a valid domain of a current functional model.

15. A system platform, the system platform configured to:
collect local data from a hub;
create function models based on the collected local data and non-local data collected from non-local data sources;
dynamically create non-local inputs based upon the local data from the hub and the non-local data collected from non-local data sources;
transmit the created function models to the hub at a first timing, and dynamically transmit the non-local inputs to each of the hub at a second timing, wherein the first timing occurs when changes have occurred to features of the created function models, and wherein the second timing includes routine or adaptive transmission of the non-local inputs to the hub; and
wherein the hub applies current locally sensed data and the dynamically transmitted non-local inputs to the created function models.

16. The system platform of claim 15, wherein the system platform is further configured to:
collect the local data from the plurality of hubs including the hub.

17. The system platform of claim 15, wherein transmitting the models comprises a base station connected to the system platform operating to:
multicast transmit the-created function models to the hub comprising the system platform operating to:
generate a multicast scheduling control packet based upon a distribution of a plurality of network registered hubs; and
communicate to a wireless communication base station the multicast scheduling control packet.

18. The system platform of claim 17, wherein the distribution of the plurality of network registered hubs is determined based on specific functional models and data package of the non-local inputs being provided to each hub of the plurality of network registered hubs.

\* \* \* \* \*